I. H. DEXTER.
FLEXIBLE COUPLING.
APPLICATION FILED JULY 19, 1919.

1,359,157.

Patented Nov. 16, 1920.

Witnesses
Oliver W. Holmes

Inventor
Irven H. Dexter
By his Attorneys

UNITED STATES PATENT OFFICE.

IRVEN H. DEXTER, OF PEARL RIVER, NEW YORK, ASSIGNOR TO I. H. DEXTER CO., INC., OF NEW YORK, N. Y., A CORPORATION OF NEW YORK.

FLEXIBLE COUPLING.

1,359,157.  Specification of Letters Patent.  Patented Nov. 16, 1920.

Application filed July 19, 1919. Serial No. 311,956.

*To all whom it may concern:*

Be it known that I, IRVEN H. DEXTER, a citizen of the United States, residing at Pearl River, in the county of Rockland and State of New York, have invented certain new and useful Improvements in Flexible Couplings, of which the following is a specification.

This invention relates more especially to flexible couplings in which coupling members are interposed between a centrally disposed coupling disk and the shafts which are to be coupled together by said disk and coupling members. The primary object of my invention is to provide a coupling of this character of improved construction whereby a relative rotary adjustment may be imparted to said shafts without disconnecting said disk or clutch members. Another object of the present invention is to provide an improved slip joint connection for a coupling of this character. Another object is to provide improved means for releasably locking said slip joint connection. Other and further objects of invention will appear in the specification and be pointed out in the appended claims, reference being had to the accompanying drawings which exemplify my invention in a preferred embodiment and in which:—

Figure 1:
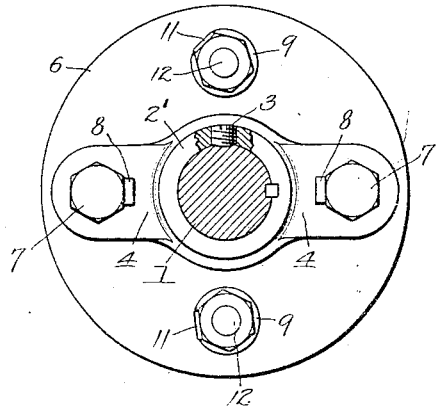
Figure 1 is a side elevation of the coupling taken from the left in Fig. 4, parts being broken away and parts shown in section.
Figure 3:
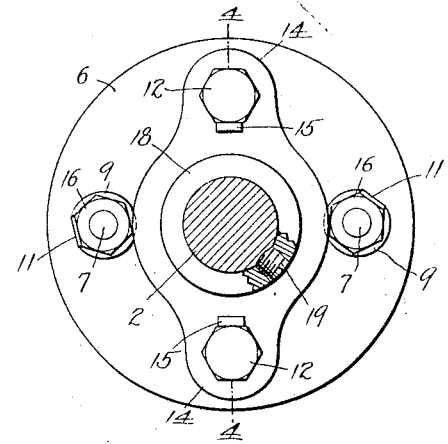
Fig. 3 is a side elevation from the right in Fig. 4, parts being broken away and parts shown in section.
Figure 2:
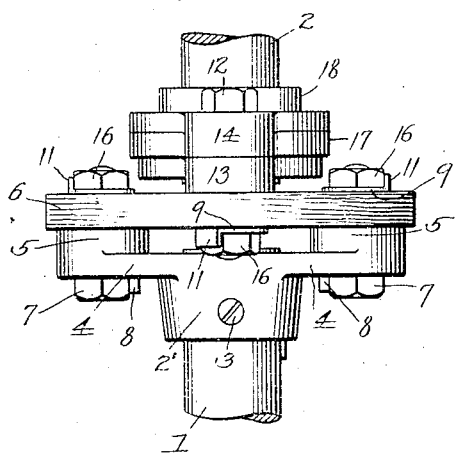
Fig. 2 is a top plan view of the coupling.
Figure 4:
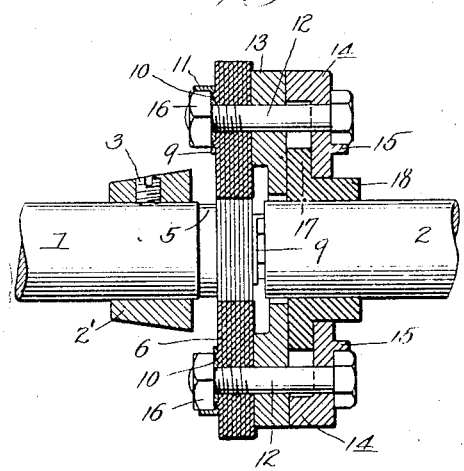
Fig. 4 is a section on the line 4—4, Fig. 3, parts being shown in elevation.
Figures 5, 6:
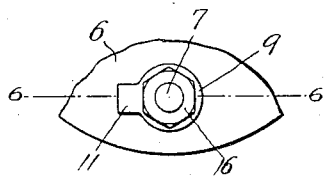
Fig. 5 is a side elevation of the nut and nut lock.
Fig. 6 is a section on the line 6—6, Fig. 5.
Figure 7:
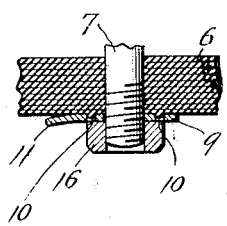
Fig. 7 is a perspective view of the nut locking plate or disk detached.

Referring more particularly to the drawing and to the embodiment shown therein, shaft sections 1 and 2 are approximately coaxially arranged as shown in Fig. 4. The hub portion 2 of one of the coupling members is secured by a set screw 3 to the shaft 1, said coupling member having oppositely projecting arms 4 provided with cylindrical bosses 5 which are secured to a coupling disk 6 by means of bolts 7. Suitable means for preventing the bolts 7 being turned in the bosses 5 are provided by lugs 8 formed on the radial arms 4, said lugs interlocking with the flat sided heads of the bolts 7. A flat disk or plate washer 9 which is shown in Fig. 7, is adapted to fit over the threaded end of each of said bolts 7 and against the lateral surface of the coupling disk 6, said coupling disk according to the present embodiment, being constructed of fabricated material. A circular series of holes or recesses 10 are provided in the plate washer or disk 9 so that when the nut 11 is screwed home on the bolt 7, the fabric composing the disk 6 is forced into the recesses or openings 10 in such a way as to lock the plate or disk 10 to the coupling disk 6. A tab or lobe 11 carried by the plate or disk 9, is adapted to be bent over into engagement with one of the flat faces of nut 10. By means of this construction, the plate or washer 9 is adapted to interlock with the coupling disk 6 as well as with the nut 10 so that said nut is locked in position on the bolt 7 and thereby prevented from coming loose. In the embodiment of my invention shown on the drawings, a second pair of bolts 12 are arranged in a plane transverse to the plane of bolts 7, said bolts 12 passing through the coupling disk 6, a coupling yoke 13, and a coupling yoke 14. The outermost coupling yoke 14 is provided with suitable lugs 15 which engage the heads of bolts 12 and prevent them turning in the yokes 13 and 14. Nuts 16 are threaded to the other ends of bolts 12, plates or washers 9 being interposed between the nuts 16 and coupling disk 6 with their lugs or tabs 11 bent into engagement with the flat sides of said nuts to lock them to the bolts 12 as well as to the coupling disk 6. By an inspection of Fig. 4, it will be seen that the coupling yokes 13 and 14 provide axially spaced flanges between which is interposed the flange 17 carried by a collar 18 which is secured to shaft 2 by means of a set screw 19. It will be understood from the foregoing description that whenever the parts are in their relative positions shown in Figs. 1 to 4 inclusive, the nuts 7 and 16 being understood to be drawn snugly against the plates or washers 9, the spaced flanges of the yoke members 13 and 14 will be drawn into clamping engagement with the flange 17 carried by the collar 18. The shafts 1 and 2 are therefore connected to rotate together by means of the flexible coupling. In the event that one of these shafts is to be rotatably adjusted relatively to the other, this adjustment is effected by bending the tabs or lobes 11 away from the nuts 16 which may then be loosened sufficiently to permit the flange 17 to slide within the yokes 13 and 14. This movement permits the shafts 1 and 2 to be adjusted to proper relative angular positions after which the nuts 16 may be tightened and the tabs or lobes 11 rebent into locking engagement with the bolts 12.

I claim:—

1. In a flexible coupling, shafts to be coupled, a flexible disk interposed between said shafts, a coupling member non-rotatably connected to one of said shafts, said coupling member being secured to said flexible disk, a flange or collar non-rotatably connected to the other of said shafts, clamping yokes adapted to slidably engage opposite faces of said flange or collar, and bolts extending through said clamping yokes and secured to said flexible disk, said bolts being provided with nuts for clamping said yokes to said flange or collar and securing them to said flexible disk.

2. In a flexible coupling, a shaft, a second shaft, a coupling disk of yieldable material, coupling members for connecting said coupling disk to said shafts, one of said coupling members being provided with fastening bolts passing through said disk, nuts for holding said bolts in position, and locking disks having recesses into which the material of said disk is impressed by said nuts and means for interlocking with said nuts.

3. In a flexible coupling, shafts to be coupled, one of said shafts being provided with a transverse flange, a coupling disk having yieldable portions, a pair of yokes having clamping flanges embracing said shaft flange, bolts passing through said yokes and coupling disk, nuts on said bolts, apertured nut locking disks interposed between said nuts and said yieldable portions of the coupling disk, and means for coupling the other shaft to said coupling disk, said apertured disks being adapted to have the yieldable portions of said coupling disk impressed into the apertures of the nut locking disks and provided with tongues for engaging said nuts.

4. In a flexible coupling, shafts to be coupled, a coupling member connected to each shaft, an interposed disk of yieldable material, bolts extending through said disk and said coupling member, washers on said bolts provided with recesses with which the material of said disk interlocks under pressure, and nuts for said bolts, said washers being provided with portions movable into locking engagement with said nuts.

5. In a flexible coupling, a shaft provided with a flange, a coupling member provided with clamping portions for releasably gripping said shaft flange, a coupling disk of yieldable material, bolts, passing through said clamping portions and said coupling disk, said coupling member being provided with means for holding said bolts against turning, washers on said bolts in abutment with said coupling disk, said washers being provided with recesses or openings into which the material of said disk is pressed to anchor said washers, nuts for said bolts, said washers being provided with portions adapted to be bent into locking engagement with said nuts, and a coupling member for connecting said disk to the other shaft.

IRVEN H. DEXTER.